US008874941B2

(12) United States Patent
Chakraborty et al.

(10) Patent No.: US 8,874,941 B2
(45) Date of Patent: Oct. 28, 2014

(54) APPARATUS AND METHOD FOR DESIGNING AN ARCHITECTURALLY HOMOGENEOUS POWER-PERFORMANCE HETEROGENEOUS MULTICORE PROCESSOR USING SIMULATED ANNEALING OPTIMIZATION

(75) Inventors: Koushik Chakraborty, Logan, UT (US); Sanghamitra Roy, Logan, UT (US)

(73) Assignee: Utah State University, Logan, UT (US)

( * ) Notice: Subject to any disclaimer, the term of this patent is extended or adjusted under 35 U.S.C. 154(b) by 296 days.

(21) Appl. No.: 13/495,961

(22) Filed: Jun. 13, 2012

(65) Prior Publication Data

US 2012/0324250 A1 Dec. 20, 2012

Related U.S. Application Data

(60) Provisional application No. 61/496,640, filed on Jun. 14, 2011.

(51) Int. Cl.
| | |
|---|---|
| *G06F 1/00* | (2006.01) |
| *G06F 1/32* | (2006.01) |
| *G06F 17/50* | (2006.01) |
| *G06F 1/20* | (2006.01) |
| *G06F 9/50* | (2006.01) |

(52) U.S. Cl.
CPC .............. *G06F 1/206* (2013.01); *G06F 1/324* (2013.01); *G06F 1/329* (2013.01); *G06F 1/3296* (2013.01); *G06F 9/5094* (2013.01)
USPC .............. 713/300; 713/100; 713/320; 703/14

(58) Field of Classification Search
CPC .............. G06F 1/00; G06F 1/32; G06F 17/50
USPC ............................ 713/100, 300, 320; 703/14
See application file for complete search history.

(56) References Cited

U.S. PATENT DOCUMENTS

| | | | | |
|---|---|---|---|---|
| 7,921,312 | B1* | 4/2011 | Pennanen et al. | 713/300 |
| 2005/0010830 | A1* | 1/2005 | Webster | 713/320 |
| 2007/0244676 | A1* | 10/2007 | Shang et al. | 703/2 |
| 2009/0222654 | A1* | 9/2009 | Hum et al. | 713/100 |
| 2011/0035203 | A1* | 2/2011 | Dalton et al. | 703/14 |
| 2012/0005505 | A1* | 1/2012 | Tolia et al. | 713/320 |
| 2012/0079290 | A1* | 3/2012 | Kumar et al. | 713/300 |

OTHER PUBLICATIONS

Koushik Chakraborty and Sanghamitra Roy, "Topologically Homogeneous Power-Performance Heterogeneous Multicore Systems", Design, Automation & Test in Europe, Mar. 14, 2011.

* cited by examiner

*Primary Examiner* — Mohammed Rehman
*Assistant Examiner* — Terrell Johnson

(57) ABSTRACT

For multicore power performance management, a first core has a first architecture and is designed for a first voltage-frequency domain. A second core has the first architecture and that is designed for a second voltage-frequency domain.

15 Claims, 7 Drawing Sheets

APPARATUS AND METHOD FOR DESIGNING AN ARCHITECTURALLY HOMOGENEOUS POWER-PERFORMANCE HETEROGENEOUS MULTICORE PROCESSOR USING SIMULATED ANNEALING OPTIMIZATION

This application claims priority to U.S. Provisional Patent Application 61/496,640 entitled "Architecturally Homogeneous Power-Performance Heterogeneous Multicore Systems" filed Jun. 14, 2011 for Koushik Chakraborty, which is incorporated herein by reference.

TECHNICAL FIELD

The present disclosure relates to architecture for producing energy efficient multicore processors under a large variety of operational conditions.

BACKGROUND

Processors are often operated at high frequencies to increase performance. However, high performance is not always needed, resulting in needless energy consumption and heat dissipation.

SUMMARY

An apparatus is disclosed for a multicore processor. A first core has a first architecture and is designed for a first voltage-frequency domain. A second core has the first architecture and is designed for a second voltage-frequency domain. A method for producing the multicore processor is also disclosed.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF SELECTED EMBODIMENTS

Figure 1:
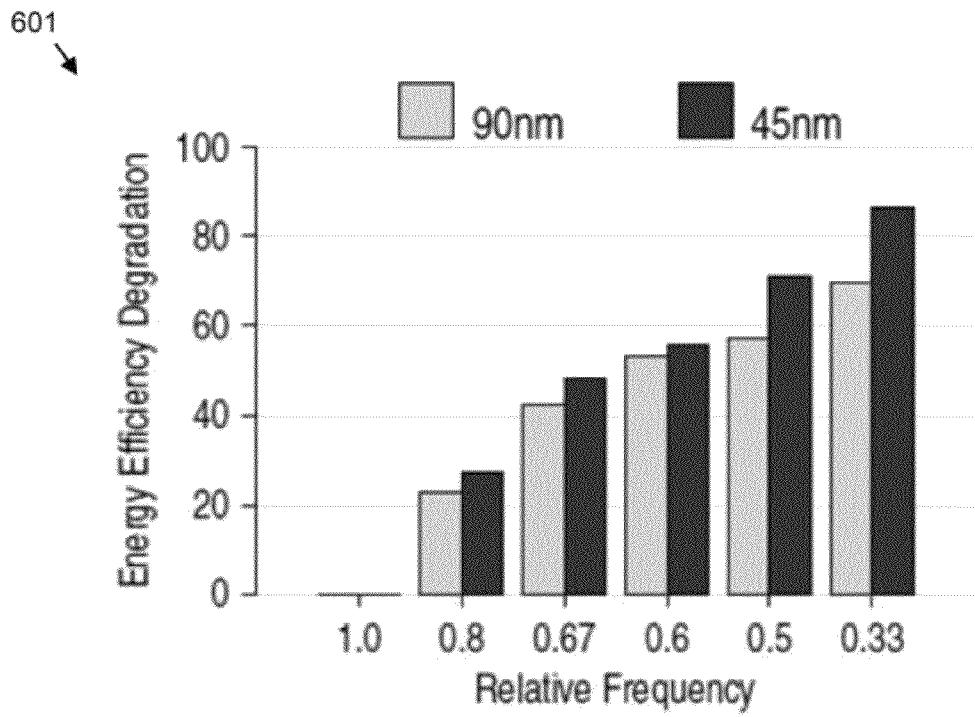
FIG. 1 is a chart showing one embodiment of the energy efficiency degradation in DVFS.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as represented in the drawings, is not intended to limit the scope of the invention, but is merely representative of the various embodiments of the invention.

Modern multicore processors have several on-chip cores, which are designed for optimal power performance at the highest utilization rate (nominal frequency). Diverse pools of applications running on these cores dictate wide variations in power-performance requirements. To cope with such variations, Dynamic Voltage and Frequency Scaling (DVFS) is employed to improve energy efficiency during low utilization, and prevent thermal violations during sustained high utilization.

It is desirable to exploit the increasing number of on-chip cores in high performance microprocessors in a power-performance optimal way. For example, a core may be designed for operation at 3 Gigahertz (GHz), but during a particular program phase, the processor may perform DVFS to operate at 2 GHz. However, the intrinsic circuit characteristics (e.g. distribution of gate sizes and threshold voltages) of the 3 GHz core are substantially different from that of a core designed ground up to be power-performance optimal at 2 GHz. It is desirable to understand their comparative power-performance, when the former is dynamically adapted to operate at 2 GHz.

We demonstrate this circuit design tradeoff using a 32-bit ALU from the ISCAS benchmark suite (c7552). We use two standard cell libraries for this study: a UMC 90 nanometer (nm) industrial library and a Taiwan Semiconductor Manufacturing Corporation (TSMC) 45 nm technology library. Both libraries are characterized for multiple threshold voltages: low Vt (LVT), regular Vt (RVT), and high Vt (HVT). We allow 20% voltage scaling to model the voltage scaling constraints of current and forthcoming technology generations.

FIG. 1 presents a chart 601 showing a quantitative comparison of how much DVFS techniques lag their corresponding ground up optimal designs in terms of energy efficiency 601, where lower indicates improvement. We report results for six operating frequencies (1=nominal). An Arithmetic Logic Unit (ALU) designed at the nominal frequency is DVFS scaled to operate at the lower operating frequencies. At each operating point, we report the percentage degradation in energy efficiency of the DVFS scaled nominal ALU with respect to the ground up optimal design at that operating frequency. Despite employing allowable DVFS, the nominal ALU suffers 57% (90 nm) and 71% (45 nm) energy efficiency degradation at 50% of the nominal frequency (0.5), compared to the ALU designed to operate at that frequency. Interestingly, this degradation in energy efficiency grows rapidly as a circuit diverges further away from its design frequency. The nominal ALU suffers 69% and 86% loss in energy efficiency, respectively, when it is DVFS scaled to operate at the relative frequency of 0.33. As leakage becomes more dominant at lower technology nodes, the degradation also becomes more pronounced as ground up designs can replace leaky devices with low leakage devices.

We use Synopsys Design Compiler for synthesizing our design with circuit optimizations. We use multiple threshold voltages (LVT, RVT, and HVT) to optimize power at the nominal frequency. Subsequently, we calculate several operating frequencies with delays progressively higher than the nominal. At each operating frequency, we perform:

Ground up optimal design: For a given latency, we synthesize the circuit with leakage and dynamic power optimization at multiple voltages (between 100% and 80% of nominal voltage) and pick the design with minimum power.

Voltage frequency scaling of nominal design: We apply DVFS on the ALU designed at the nominal frequency, to measure the scaled power components when it is operated at a frequency lower than nominal.

Table 1 presents detailed internal circuit characteristics of ground up optimal designs at the six operating points for 90 nm and 45 nm nodes, which lead to the energy efficiency trend seen in FIG. 1. We present: (a) total area; (b) percentage area distribution of LVT, RVT and HVT gates in the circuit; and (c) operating voltage. It is seen that the internal circuit characteristics of the same functional unit vary substantially when optimized at different performance points. When designed for the highest performance, the circuit takes up the largest area as different gates in the circuit are sized up. We find the largest concentration of LVT devices at the highest performance level (1.0). At lower performance levels, the power consumption drops significantly due to (a) smaller area (lower gate capacitance), (b) lower leakage due to the reduction of LVT devices and (c) lower supply voltage.

architecturally homogenous power-performance heterogeneous (AHPH) multicore. The first phase selects the voltage-frequency domain levels that maximize the energy efficiency of the multicore system. The method for voltage-frequency selection depends on the number of cores, the workload characteristics as well as the technology node.

We disclose the voltage-frequency domain selection problem, analyze its complexity, and describe our simulated annealing based stochastic method. For the ease of comprehension, we distinguish application and workload in the following way. Applications for a multicore system consist of individual programs such as SPEC CPU2006 benchmarks. Workloads on the other hand, contain a collection of applications to run on the target multicore. Detailed description of our multicore workloads based on virtual machine consolidation is given later. A set of k permissible VF domain levels denoted by the set PD shown in Equation 1.

$$PD=\{(v_1,f_1),\ldots,(v_k,f_k):f_k>f_{k-1}>\ldots>f_2>f_1\}. \quad \text{i. Equation 1}$$

A VF domain assignment is selected for a multicore system with n cores to maximize the system level energy efficiency, while minimizing the expected performance loss. We denote a possible VF assignment by the set V, where Equation 1 satisfies the conditions of Equation 2.

$$V=\{(V_i,F_i):(V_i,F_i)\in PD, 1\leq i\leq n\}. \quad \text{i. Equation 2}$$

TABLE 1

| Rel. Freq. | 1.0 | 0.8 | 0.67 | 0.6 | 0.5 | 0.33 |
|---|---|---|---|---|---|---|
| Tech. Node 90 nm | | | | | | |
| Area | 11879 | 8955 | 8808 | 7402 | 5603 | 4463 |
| HVT | 3.6% | 8.6% | 8.3% | 8.6% | 20.6% | 49.8% |
| RVT | 16.2% | 43.1% | 64.3% | 86.1% | 76.26% | 47.3% |
| LVT | 80.2% | 48.2% | 27.4% | 5.3% | 3.19% | 2.8% |
| Voltage V | 1.0 | 0.95 | 0.85 | 0.85 | 0.85 | 0.85 |
| Tech. Node 45 nm | | | | | | |
| Area | 2120 | 1306 | 1151 | 1071 | 1012 | 980 |
| HVT | 13.0% | 22.4% | 38.9% | 43.6% | 56.9% | 71.1% |
| RVT | 24.0% | 34.1% | 33.9% | 32.4% | 30.5% | 22.8% |
| LVT | 63.0% | 43.5% | 27.2% | 24.0% | 12.6% | 6.1% |
| Voltage V | 0.99 | 0.84 | 0.81 | 0.81 | 0.81 | 0.81 |

At the system level, the performance impact of lower operating frequency is diverse: not all applications are equally affected by the core frequency.

Figure 2:
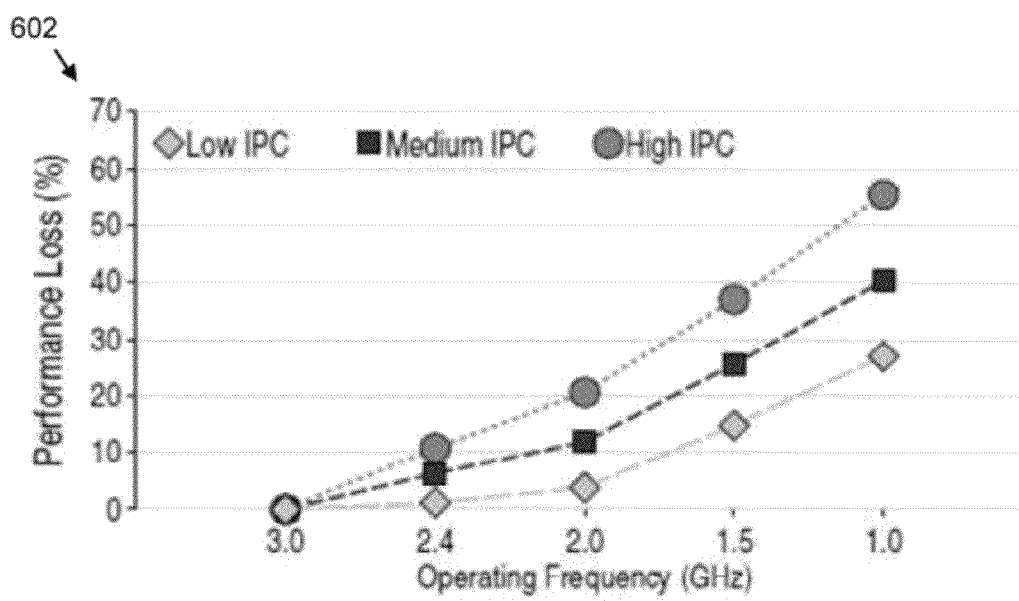
FIG. 2 is a chart showing one embodiment of performance loss from core frequency scaling.

FIG. 2 shows a chart 602 of a diversity in SPEC CPU2006 of workloads for the exemplary design embodiment of FIG. 1. We categorize the diversity in three different classes that collectively capture the range of IPCs (instructions per cycle) seen in these workloads. It is seen that low IPC workloads suffer substantially lower performance loss at lower frequencies compared to high IPC workloads.

Ground up optimal designs at any performance level are substantially more energy efficient than their DVFS scaled counterparts. Given the diverse latency requirements of on-chip cores in modern multicores, we develop design automation techniques to apply this circuit design style for an entire system design.

We utilize a cost-effective heterogeneous multicore design architecture as an energy efficient alternative to DVFS based multicore systems. This architecture creates several architecturally identical cores, designed ground up to be power and performance optimal at specific voltage-frequency domains. We now briefly discuss two specific phases in the design of an In order to maximize the overall energy efficiency, we use an objective function that correlates with the total energy of the VF assignment under a bound on the performance loss. We develop a regression model of energy $E(F_i)$ as a function of the core frequency $F_i$. Hence our objective function for assignment v is given by Equation 3.

$$\Sigma_{i=1}^{n} E(Fi(v)). \quad \text{i. Equation 3}$$

Our selection of voltage-frequency domains is further constrained by an estimation of the expected performance loss of the system. For a general purpose microprocessor, a large number of applications can combine in various phases creating a very large workload space. For example, characterizing the application phases into p IPC classes creates a workload space of size $p^n$ with exponential complexity. Exhaustive evaluation of all possible workload combinations becomes an extremely hard problem.

We use a simulated annealing based stochastic optimization to formulate our voltage-frequency domain selection. We define Multicore Performance Yield (Y) to estimate the performance loss in a large workload space as Equation 4.

$$Y(v) = Pr \frac{1}{n} \sum_{i=1}^{n} \frac{IPC_i(v)}{IPC_{base}} \geq L_0 \quad \text{Equation 4}$$

IPCbase is the IPC of an application running in a core with the highest voltage-frequency domain, while $IPC_i(v)$ is the IPC of the same application running on the $i^{th}$ core with a VF tuple $(V_i, F_i)$ in v. $Y(v)$ is the probability that a voltage-frequency domain assignment V produces a relative performance higher than $L_0$ under diverse workload combinations. Note that Y uses a conservative estimate of IPCbase, as certain applications may not be able to continually execute at the highest VF level due to their thermal profile. Therefore, a thermally aware throughput of AHPH can be higher than a multicore composed of cores designed for the nominal frequency.

We use Monte Carlo simulations with 1000 randomly selected samples of applications to estimate Y (v) using Equation 4 and characterized performance loss data similar to FIG. 2. Our VF selection problem can be formulated as shown in Equation 5.

$$\text{Minimize} \Sigma E(F_i(v)) s.t. Y(v) \geq Y_0 \quad \text{i. Equation 5}$$

Equation 5 shows our simulated annealing optimization method. The method follows the traditional simulated annealing schedule where anneal temperature T is initialized to a high value $T_0$ and cools down to $\epsilon$.

A trivial initial solution is $v_{in} = \{(Vi, Fi): Vi = v_k, F_i = f_k, 1 \leq i \leq n)\}$. This solution obeys the yield constraint in equation (2) as it assigns the highest VF domain to each core. Since more than one core can have the same voltage-frequency domain assigned, the size of the solution space is given by Equation 6.

$$i. \binom{k+n-1}{n} \quad \text{Equation 6}$$

We perturb our current solution V using two types of moves which combine to explore the entire solution space. Move $M_0$ randomly selects a voltage-frequency domain in v and raises it to the next higher voltage-frequency level in PD. Move M1 randomly selects a voltage-frequency domain in V and lowers it to the immediate lower VF level in PD. APPLY RANDOM MOVE(v) randomly selects and applies a move to v. ANNEAL CRITERIA MET($O, O_{new}$) evaluates to true if: (1) $O_{new}$ is smaller than O; or (2) $O_{new}$ is larger than O with a probability of accepting uphill moves that decrease with the progress of annealing.

After selecting the target voltage-frequency domains in a multicore processor we synthesize individual cores for their target frequencies, in a ground-up manner. A key challenge beyond that is to adapt to the runtime variation in workload characteristics.

The basic objective of the runtime adaptation technique is to reassign workloads on the available AHPH cores to better fit their runtime execution characteristics, while also alleviating thermal emergencies.

At each scheduling epoch, we reassign the workloads on different clusters or different cores within the cluster. During task migration, the hardware saves and restores the register state using the on-chip caches. Using the performance counters to monitor IPC, the hardware selects the best possible voltage-frequency domain for an application. Within the same cluster, the migration overhead is small, and thus such reassignments are always favored over inter-cluster reassignments. An inter-cluster reassignment is accomplished when the voltage-frequency domains differ by at least two discrete frequency levels.

Figure 3:
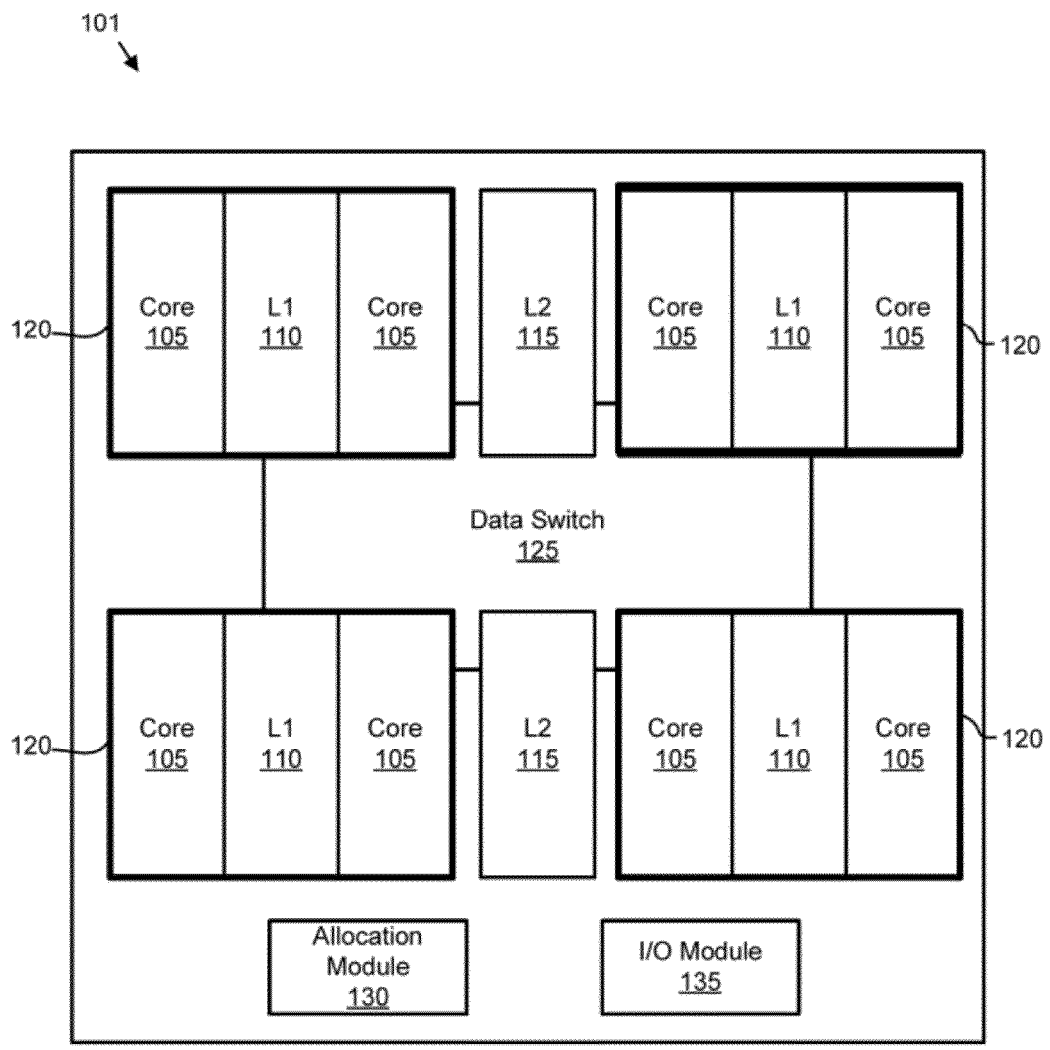
FIG. 3 is a chart showing one embodiment of a clustered multicore system.

The hardware task migration avoids context switch to the operating system, but incurs overhead due to: (a) saving and restoring register state; (b) effect of cold cache, and (c) loss of branch predictor state. The cold cache effect is a major component, but it is incurred only during inter-cluster migration, as first level caches are shared within a cluster, as shown in FIG. 3. In our full system architectural simulator infrastructure, we faithfully model both the latency and energy overhead of task migration in the results presented. Across all workloads, latency overheads are less than 2%, while the power overheads are less than 1%.

We combine an elaborate standard cell based CAD design flow with a detailed cycle accurate full system architectural simulation to evaluate the energy efficiency of the system using real workloads.

We use full-system simulation built on top of Virtutech SIMICS. SIMICS provides the functional model of several popular ISAs, in sufficient detail to boot an unmodified operating system and run commercial applications. For our experiments, we use the SPARC V9 ISA, and use our own detailed timing model to enforce timing characteristics of an 8-core clustered multicore system.

FIG. 3 shows a schematic block diagram of an exemplary embodiment of a clustered multicore processor 101. The processor 101 may be an apparatus. The processor 101 is similar to Sun Microsystems' ROCK multicore chip, where first level caches are shared within a cluster 120. The depicted processor 101 employs four clusters 120. One of skill in the art will recognize that embodiments may be practiced with any number of clusters 120. Each cluster 120 is depicted with two on-chip cores 105. One of skill in the art will recognize that embodiments may be practiced with any number of cores 105.

In one embodiment, a first core 105 has a first architecture and is designed for a first voltage-frequency domain. A second core 105 has the same first architecture and is designed for a second voltage-frequency domain. As a result, processing tasks may be allocated to either the first core 105 or the second core 105 to increase performance or to reduce power consumption.

An exemplary embodiment, cores 105 may share both L1 caches 110. L2 caches 115 may be shared between clusters 120. In one embodiment, the L1 caches 110 and/or the L2 caches 115 use a MESI coherence protocol. The on-chip cores 105 may have a seven-stage pipeline, with dual-issue 32 entry out-of-order issue window. The L1 cache 110 may have a single-cycle latency. The L2 cache 115 may be a 16-way 8 MB cache. The L2 cache 115 and a main memory (not shown) may be accessed in 25 and 240 cycles, respectively.

An allocation module 130 may allocate processing tasks among cores 105. A processing task may be a tread, a call, or the like. A data switch 125 may route instructions and data from an input/output (I/O) module 135 to the clusters 120. Alternatively, the data switch 125 may route instructions and data between cores 105 and/or between clusters 120.

The cores 105, L1 caches 110, L2 caches 115, data switch 125, clusters 120, allocation module 130, and I/O module 135 may be fabricated of semiconductor gates. The exemplary processor 101 may use the 45 nm technology node, with 0.99V $V_{DD}$ and 3.0 GHz nominal frequency.

In one embodiment, the allocation module 130 allocates a processing task from a higher voltage-frequency domain core 105 to a lower voltage-frequency domain core 105 if a utilization rate of the higher voltage-frequency domain core 105 falls below a lower utilization threshold for an epoch. The epoch may be a number of instructions executed, an interval of time, or the like. The lower utilization threshold may be selected from the group consisting of a workload, a temperature, and instructions executed per epoch. The allocation module 130 may allocate the processing task from the lower voltage-frequency domain core 105 to the higher voltage-frequency domain core 105 if a utilization of the lower voltage-frequency domain core exceeds an upper utilization threshold for the epoch. The upper utilization threshold may be selected from the group consisting of a workload, a temperature, and instructions executed per epoch.

The exemplary processor 101 is simulated using several consolidated virtual machines, each running a SPEC CPU2006 benchmark on Solaris 9 operating system to benchmark performance of the exemplary system. The representative portions of each application are extracted using the SimPoint toolset. We select the two most representative phases from these SPEC benchmarks. Table 3 shows the composition of our consolidated virtual machine workloads. Workloads are run for 100 million instructions. Each benchmark is shown in parentheses.

TABLE 2

| Workloads | Composition |
| --- | --- |
| VM1 | astar-lakes(both), xalancbmk (2), sjeng (2), h264 (both), libquantum(2), hmmer(1) |
| VM2 | mcf (both), hmmer (both), h264 (1), xalancbmk (1), gobmk(both) |
| VM3 | hmmer(2), gcc (both), omnetpp(both), libquantum (1), perlbench(2) |
| VM4 | gobmk(both), perlbench(1), sjeng(1), h264(both), mcf(2), libquantum(2) |
| VM5 | mcf(2), sjeng(1), astar-lakes(both), omnetpp(2), h264(1), gcc(both) |
| VM6 | libquantum(both), xalancbmk(2), gcc(both), mcf(both), bzip2(1) |
| VM7 | mcf(2), xalancbmk(2), h264(both), omnetpp(both), astar-lakes(2), bzip2(2) |
| VM8 | xalancbmk(both), perlbench(both), bzip2(1), mcf(2), sjeng(1), omnetpp(1) |

We generate accurate power and timing information for designs tuned at multiple operating frequencies using an extensive standard cell-based CAD flow. The energy consumption is then calculated by combining the cycle-level usage information from our architectural simulation with power and timing from the standard cell library flow.

We design a 64-bit out-of-order microprocessor core containing the following critical modules in Verilog: 64-bit ALU, 64-bit Register File with four banks, 64 bit Rename logic incorporating a CAM table and freelist, and 64-bit Instruction Scheduler (32 entry). These designs are developed and verified using the ModelSim simulation tool. Next, the microprocessor core is synthesized for various target frequencies using Synopsys Design Compiler and a 45 nm TSMC standard cell library. We measure the frequency, dynamic, and leakage power of the synthesized cores at each voltage-frequency operating point. Cache powers are estimated using Cacti 6.0.

To estimate workload dependent runtime core power, we combine the dynamic power and leakage power characteristics of the synthesized hardware, and the runtime usage for processor components from the architectural simulator. Multicore power dissipation data is then fed to HotSpot 4.2, which is integrated with our architectural simulator to obtain transient temperatures. Our overall model is similar to the Wattch based techniques. However, we use a more accurate power estimation using synthesized hardware, instead of linear scaling.

Before the simulation run, we feed the power trace for each workload to derive steady-state thermal characteristics of the multicore system. Subsequently, transient temperatures are used to model thermal emergencies triggered by on-chip thermal sensors. In our experiments, we use 90° C. as the thermal threshold. We use a sampling interval of 0.05 msec to communicate runtime power dissipation with Hotspot. Transient temperatures are also used to adjust the temperature dependent leakage power in our experiments.

Based on the workload and multicore configuration, Table 3 shows voltage-frequency domains as selected by embodiments, where L0 and Y0 are set to 0.85 and 0.8, respectively.

TABLE 3

| Cluster | Core Configuration |
| --- | --- |
| Cluster 0 | Core 0: 0.99 V, 3.0 Ghz; Core 1: 0.84 V, 2.4 Ghz |
| Cluster 1 | Core 0: 0.99 V, 3.0 Ghz; Core 1: 0.81 V, 2.0 Ghz |
| Cluster 2 | Core 0: 0.84 V, 2.4 Ghz; Core 1: 0.81 V, 2.0 Ghz |
| Cluster 3 | Core 0: 0.81 V 1.8 Ghz; Core 1: 0.81 V, 1.5 Ghz |

A large number of schemes are possible within the entire design spectrum of Multicore DTM. We chose the following pivotal core designs that capture the state-of-the-art spectrum wide characteristics:

Homogeneous cores with DVFS (D-DVFS). DVFS is applied where frequency levels are set using feedback control. Changing the voltage-frequency domain of a core will likely incur transition delay costs. Since cores are designed for the nominal frequency, altering the frequency levels makes them power inefficient. In one embodiment, no task migration is performed when a frequency for a D-DVFS core is modified.

Homogeneous cores with Static Voltage-Frequency Scaling (SVFS). Homogeneous cores, designed for nominal frequency, are tuned statically to operate at different voltage-frequency domains. Frequent hardware driven task migration is performed. We use DVFS to avoid thermal emergencies, such as an excessive processor temperature.

Architecturally Homogeneous Power-performance Heterogeneous cores (AHPH). An AHPH core is a simplified version of our proposed multicore system, comprising of architecturally homogeneous power-performance heterogeneous cores. Workload assignments are static, and no task migrations are performed. DVFS is performed only to avoid thermal emergencies.

Architecturally Homogeneous Power-performance Heterogeneous cores with Task Migrations (AHPH-TM). The AHPH-TM core is similar to AHPH, but performs task migrations to adapt to transient variations in workload characteristics.

A summary of the fundamental characteristics of the above schemes is shown in Table 4. Except in D-DVFS, voltage-frequency domains may be fixed in the other three designs, except to avoid thermal emergencies (90.00 C in our setup). We assume a 10 μs transition delay for switching between voltage-frequency domains. We use 10,000 cycles as the scheduling epoch for our runtime adaptation, and model all aspects of our runtime task migration overhead.

TABLE 4

| Scheme | H/W Task Migration | Overhead | Power Efficient |
|---|---|---|---|
| D-DVFS | No | VF transition delays | No |
| SVFS | Yes | Task migration | No |
| THPH | No | VF transition delays | Yes |
| THPH-TM | Yes | Task migration | Yes |

Figure 4:
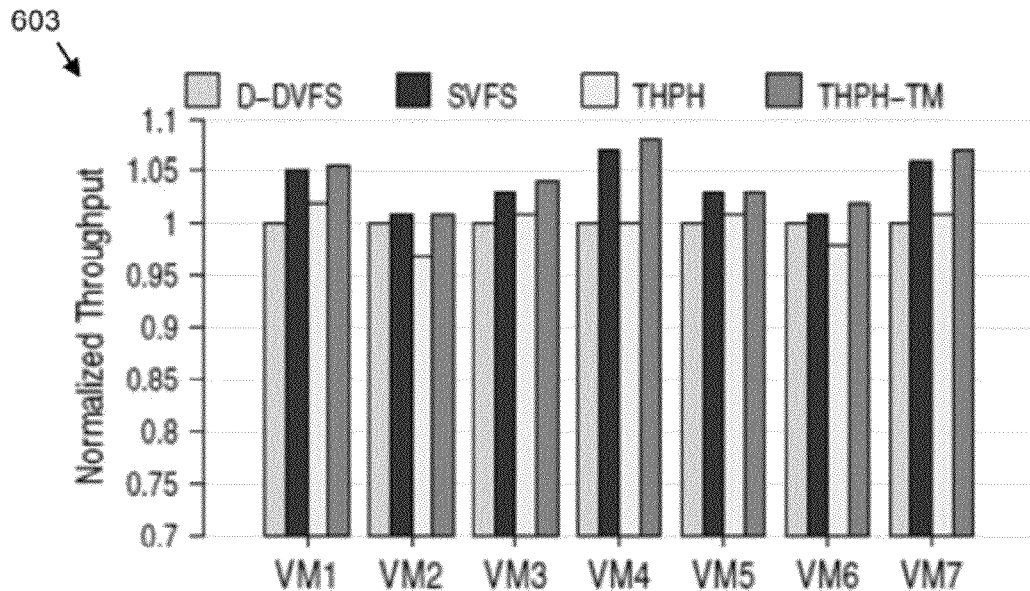
FIG. 4 is a chart showing one embodiment of a throughput comparison.

FIG. 4 presents a chart 603 showing the throughput comparison 601 between the different schemes. Overall, hardware driven task migration in SVFS is able to improve the throughput by avoiding voltage-frequency transition delays, and utilizing high speed task migration. AHPH performs comparably to the D-DVFS scheme, but without task migration it is unable to exploit the opportunities to reassign the workloads. However, more power efficient cores lead to substantially smaller thermal violations, which avoid voltage-frequency transition delays. With task migration, AHPH-TM performs similar to SVFS, but outperforms in a few workloads.

Figure 5:
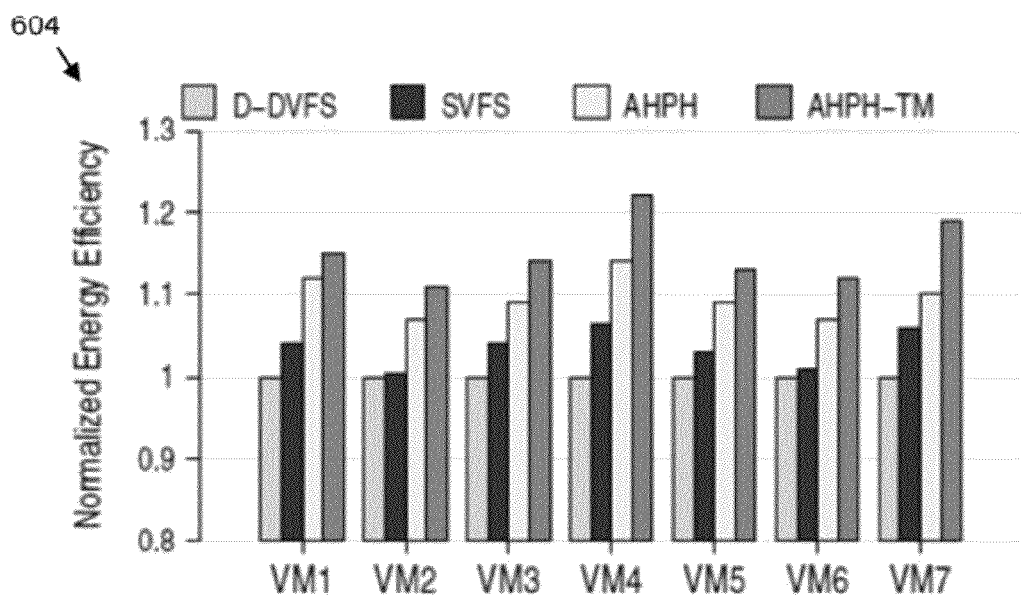
FIG. 5 is a chart showing one embodiment of an energy efficiency comparison.

FIG. 5 presents a chart 604 showing the energy efficiency comparison 605 for the exemplary design. We measure the energy efficiency as throughput (Billion Instruction Per Second/Watt). Across all workloads, the use of power efficient cores 105 in our schemes substantially improves energy efficiency. AHPH shows an overall improvement of 7-14%, which is primarily due to conservation of energy consumption through a combination of high, medium and low power cores. AHPH-TM is able to boost the throughput while saving energy consumption, delivering an overall improvement of 11-22% in energy efficiency. Compared to SVFS that uses the same VF domains in homogeneous cores, both the AHPH schemes perform substantially better due to our power efficient design paradigm.

Figure 6:
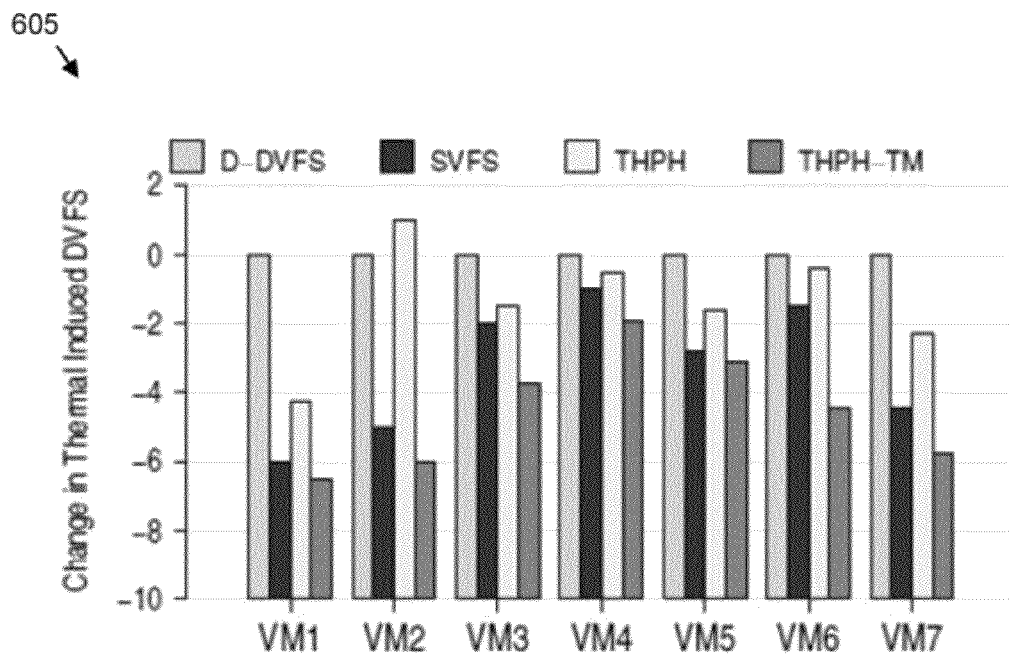
FIG. 6 is a chart showing one embodiment of percentage change in thermal-induced DVFS.

FIG. 6 presents a chart 605 showing a comparison of DVFS induced by thermal sensors across different schemes 605. A percentage change in these events compared to D-DVFS is shown. When a temperature threshold is indicated in a given core 105, both D-DVFS and AHPH immediately reduce their voltage-frequency domain. However, SVFS and AHPH-TM attempt to tackle the problem by applying task migration. If the same sensor again indicates temperatures beyond the threshold, the voltage-frequency domain may be lowered again, indicating a thermal-induced transition.

AHPH lacks both feedback driven control and task migration capability, which can lead to higher thermal emergency responses. However, using power efficient cores in AHPH substantially reduces these events. Overall, we notice up to a 4% reduction in thermal induced transitions in AHPH. Using task migration reduces these transitions in SVFS and we observe up to a 6% reduction. AHPH-TM is able to further reduce these events, as it benefits from both task migration and power efficient cores, improving its thermal characteristics.

Figure 7:
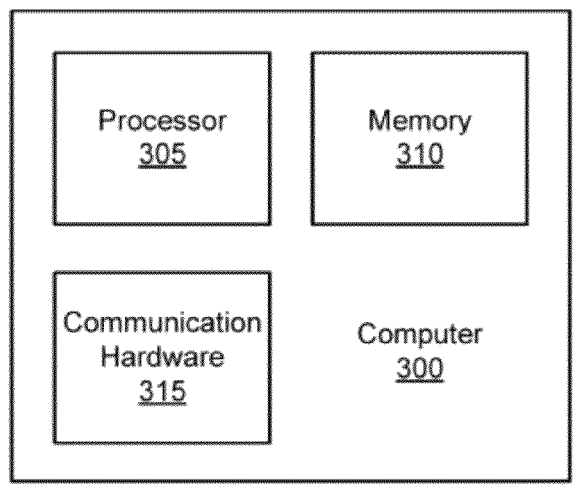
FIG. 7 is a schematic block diagram showing one embodiment of a computer.

FIG. 7 is a schematic block diagram showing one embodiment of a computer 300. The computer 300 may perform the cell library modifications, the simulated annealing optimization, and the performance benchmarking described herein. The computer 300 includes a processor 305, a memory 310, and communication hardware 315. The memory 310 may be a computer readable storage medium such as a semiconductor storage device, a hard disk drive, and optical storage device, a micromechanical storage device, a holographic storage device, or combinations thereof. The memory 310 may store computer readable program code. The processor 305 may execute the computer readable program code. The communication hardware 315 communicates with other devices.

Figure 8:
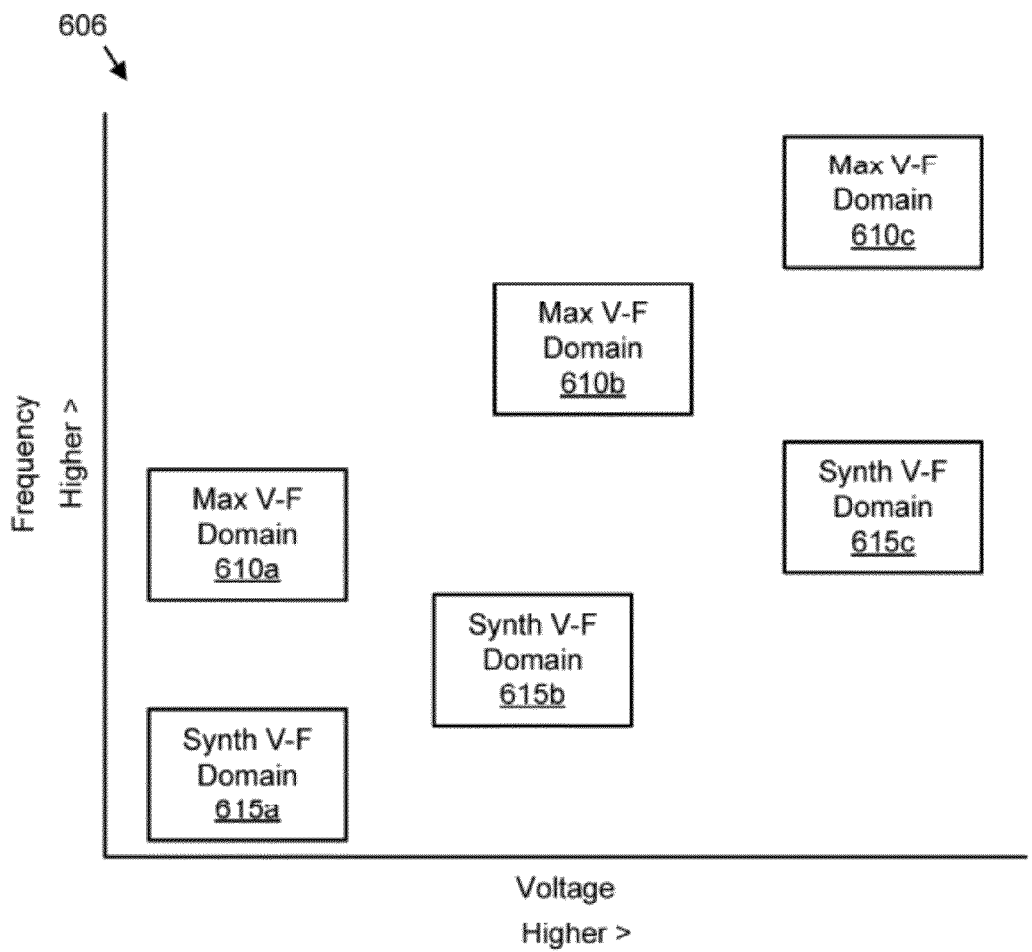
FIG. 8 is a graph showing one embodiment of voltage-frequency domains.

FIG. 8 is a graph 606 showing one embodiment of voltage-frequency domains 610, 615. The graph 606 shows a plurality of voltage-frequency domains 610, 615. Maximum voltage-frequency domains 610 may be domains that are available from a standard cell library. Synthesized voltage-frequency domains 615 may be synthesized from the maximum voltage-frequency domains 610. For example, a first synthesized voltage-frequency domain 615a may be synthesized from a first maximum voltage-frequency domain 610a by reducing the frequency employed.

In addition, synthesized voltage-frequency domains 615 may be synthesized with lower voltages. For example, a second synthesized voltage-frequency domain 615b may be synthesized from a second maximum voltage-frequency domain 610b by reducing the frequencies and voltages employed. Thus a plurality of synthesized voltage-frequency domains 615 may be synthesized to extend the voltage-frequency domains 610 available in a cell library.

Figure 9:
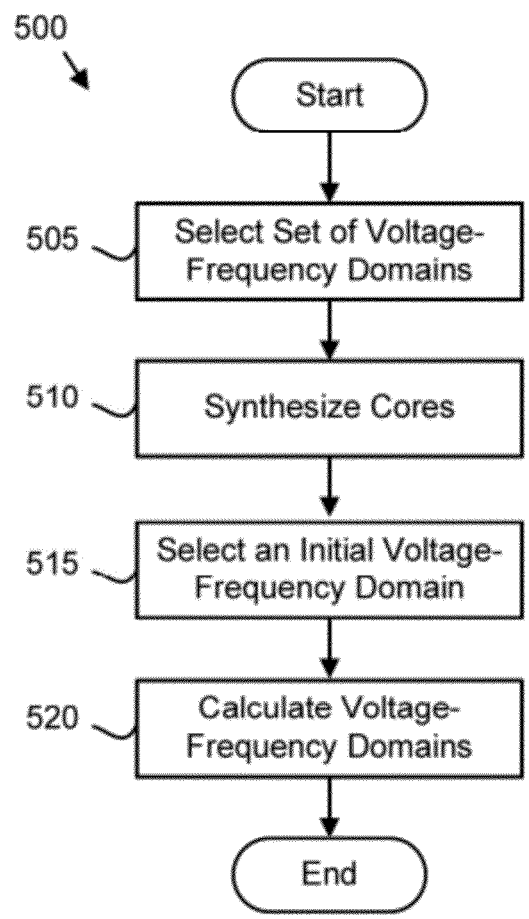
FIG. 9 is a flow chart diagram showing one embodiment of a multicore design method.

FIG. 9 is a flow chart diagram showing one embodiment of a multicore design method 500. The method 500 may be performed by computer readable program code stored in a computer readable storage medium such as a memory 310 and executed by the processor 305.

The method 500 starts, and in one embodiment the method 500 selects 505 a set of voltage-frequency domains 610, 615. The voltage-frequency domains 610 may be standard cell library voltage-frequency domains 610. Alternatively, the voltage-frequency domains 610, 615 may be synthesized voltage-frequency domains 615. The voltage-frequency domains 610, 615 may be specified for a standard cell library. Alternatively, the voltage-frequency domains 610, 615 may be selected by a designer.

The method 500 may further synthesize 510 the first core 105 and the second core 105. In one embodiment, the first core 105 and the second core 105 are synthesized for one or more specified voltage-frequency domains 610, 615. In one embodiment, the first core 105 and the second core 105 are each selected from the core type consisting of homogeneous cores with D-DVFS, SVFS, AHPH, and AHPH-TM.

In addition, the method 500 may select 515 an initial voltage-frequency domain. In one embodiment, a voltage-frequency domain 610, 615 with the highest voltage and/or highest frequency is selected 515 as the initial voltage-frequency domain.

The method 500 calculates 520 a first voltage-frequency domain 610, 615 for the first core 105 with the first architecture. In addition, the method calculates 520 a second voltage-frequency domain 610, 615 for the second core 105 with the first architecture. The first voltage-frequency domain 610, 615 and second voltage-frequency domain 610, 615 may be calculated through simulated annealing minimization of Equation 5.

Figure 10:
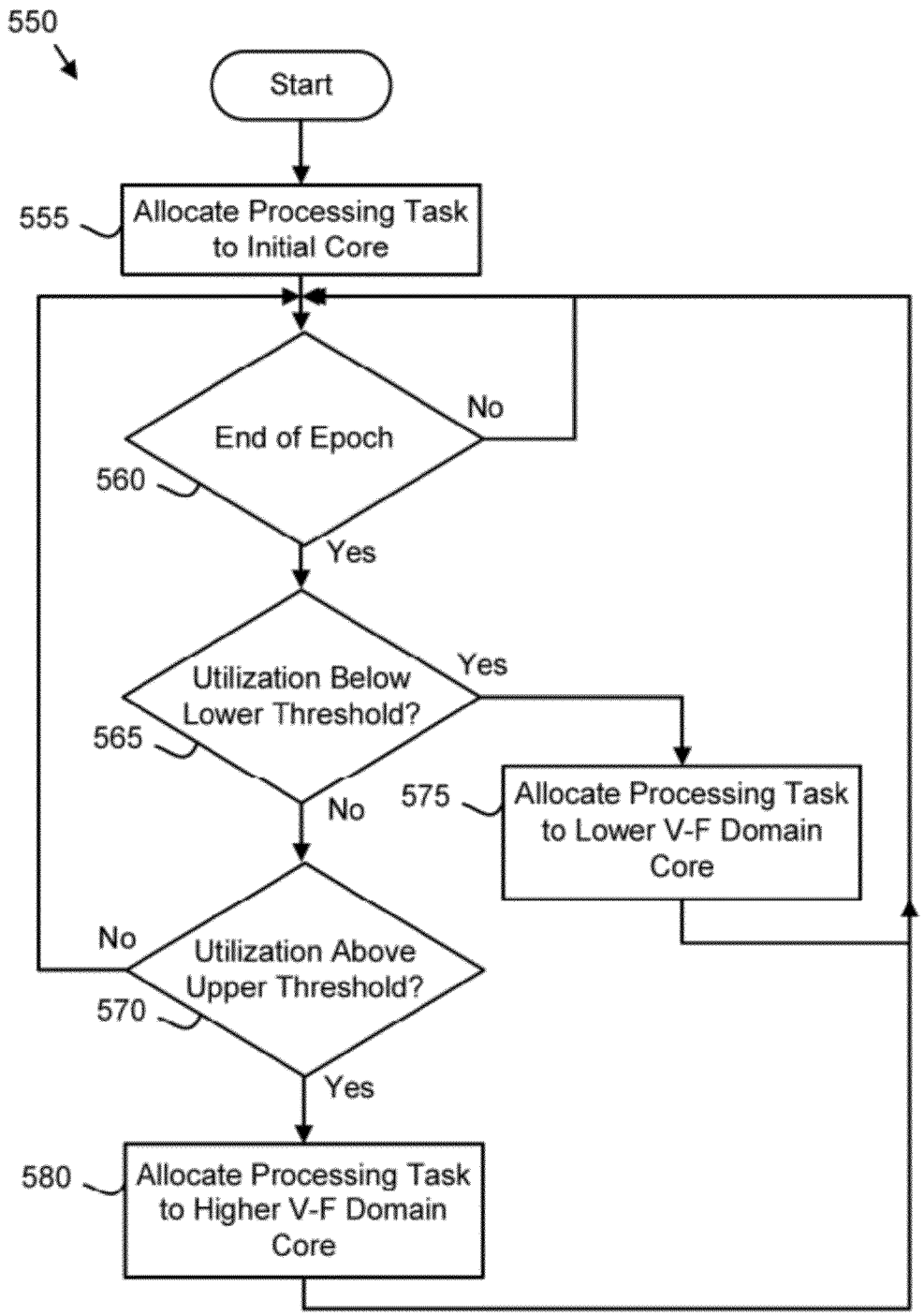
FIG. 10 is a flow chart diagram showing one embodiment of a process task allocation method.

FIG. 10 is a flow chart diagram showing one embodiment of a process task allocation method 550. The method 550 may be performed by the allocation module 130 during run time.

The method 550 starts, and in one embodiment the allocation module 130 allocates 555 a processing task to an initial core 105. The allocation module 130 further determines 560 if an epoch ends. When the epoch ends, the allocation module 130 determines 565 if a utilization of the core 105 falls below a lower utilization threshold. If the utilization rate of the core 105 falls below the lower utilization threshold, the allocation module 130 allocates 575 the processing task to a core 105 with a lower voltage-frequency domain 610, 615 and lower power consumption. If the utilization rate of the core 105 does not fall below the lower utilization threshold, the allocation module 130 determines 570 if the utilization rate of the core 105 exceeds an upper utilization threshold. If the utilization rate of the core 105 exceeds the upper utilization threshold, the allocation module 130 allocates 580 the processing task to a core 105 with a higher voltage-frequency domain 610, 615 and increased performance.

By allocating processing tasks between cores 105 the method 550 supplies increased performance when needed while reducing overall power consumption.

While specific embodiments and applications have been illustrated and described, it is to be understood that the disclosed invention is not limited to the precise configuration and components disclosed herein. The described embodiments are to be considered in all respects only as illustrative, and not restrictive. The present invention may be embodied in other specific forms without departing from its fundamental functions or essential characteristics. Various modifications, changes, and variations apparent to those of skill in the art may be made in the arrangement, operation, and details of the system of the present invention disclosed herein without departing from the spirit, scope, and underlying principles of the disclosure.

What is claimed is:

1. An apparatus comprising:
    a first core with a first architecture and that is designed for a first voltage frequency domain; and
    a second core with the first architecture and that is designed for a second voltage-frequency domain, wherein the first voltage-frequency domain and second voltage-frequency domain are calculated by selecting a set of voltage-frequency domains for a standard cell library, reducing one or more of a frequency and a voltage of each voltage-frequency domain in the set of voltage-frequency domains to synthesize synthetic voltage-frequency domains in the set of voltage-frequency domains, and calculating the first voltage-frequency domain and second voltage-frequency domain through simulated annealing minimization of an equation $\Sigma E(F_i(v))$
    wherein E is an energy consumption, F is a frequency in the set of voltage-frequency domains, v is a voltage in the set of voltage-frequency domains, and v and F(v) are initially set to a highest voltage-frequency domain of the standard cell library, and the simulated annealing minimization is a function of a multicore performance yield as a function of voltage Y(v) for the first core and the second core, wherein Y(v) is calculated as $Y(v)=Pr1/n\Sigma_{i=1}^{n} IPC_i(u)/IPC_{base}$
    where Pr is performance of the first core and the second core, IPCbase is instructions per cycle (IPC) of an application running in a core of the first and second cores with a highest voltage-frequency domain, IPCi(v) is an IPC of the application running on an $i^{th}$ core.

2. The apparatus of claim 1, wherein the first core and the second core are each selected from the core type consisting of homogeneous cores with Dynamic Voltage and Frequency Scaling (D-DVFS), homogeneous cores with Static VF (SVFS), homogeneous power-performance heterogeneous cores (AHPH), and Architecturally homogeneous power-performance heterogeneous cores with task migrations (AHPH-TM).

3. The apparatus of claim 1, wherein the set of voltage-frequency domains are synthesized for the first architecture from the standard cell library by selecting at least two frequencies that do not exceed a maximum frequency for each standard cell library voltage.

4. The apparatus of claim 3, wherein the set voltage-frequency domains are specified.

5. The apparatus of claim 1, further comprising an allocation module allocating a processing task at runtime to one of the first core and the second core for an epoch.

6. The apparatus of claim 5, wherein the processing task is allocated from a higher voltage-frequency domain core to a lower voltage-frequency domain core if a utilization of the higher voltage-frequency domain core falls below a lower utilization threshold for the epoch and the processing task is allocated from the lower voltage-frequency domain core to the higher voltage-frequency domain core if a utilization of the higher voltage-frequency domain core exceeds an upper utilization threshold for the epoch.

7. The apparatus of claim 6, wherein the utilization is selected from the group consisting of a workload, a temperature, and instructions executed per epoch.

8. The apparatus of claim 1, wherein the first core is synthesized with the first architecture for the first voltage-frequency domain and the second core is synthesized with the first architecture for the second voltage-frequency domain.

9. A method for multicore processor design comprising:
    selecting a set of voltage-frequency domains for a cell library;
    synthesizing synthetic voltage-frequency domains in the set of voltage-frequency domains by reducing one or more of a frequency and a voltage of each voltage-frequency domain in the set of voltage-frequency domains;
    calculating a first voltage-frequency domain for a first core with a first architecture and a second voltage-frequency domain for a second core with the first architecture through simulated annealing minimization of an equation $\Sigma E(F_i(v))$
    wherein E is an energy consumption, F is a frequency in the set of voltage-frequency domains, v is a voltage in the set of voltage-frequency domains, and v and F(v) are initially set to a highest voltage-frequency domain of the standard cell library, and the simulated annealing minimization is a function of a multicore performance yield as a function of voltage Y(v) for the first core and the second core, wherein Y(v) is calculated as $Y(v)=Pr1/n\Sigma_{i=1}^{n} IPC_i(u)/IPC_{base}$
    where Pr is performance of the first core and the second core, IPCbase is instructions per cycle (IPC) of an application running in a core of the first and second cores with a highest voltage-frequency domain, IPCi(v) is an IPC of the application running on an $i^{th}$ core.

10. The method of claim 9, wherein the first core and the second core are each selected from the core type consisting of homogeneous cores with Dynamic Voltage and Frequency Scaling (D-DVFS), homogeneous cores with Static VF (SVFS), homogeneous power-performance heterogeneous cores (AHPH), and Architecturally homogeneous power-performance heterogeneous cores with task migrations (AHPH-TM).

11. The method of claim 9, wherein a set of voltage-frequency domains are synthesized for the first architecture from a standard cell library by selecting at least two frequencies that do not exceed a maximum frequency for each standard cell library voltage.

12. The method of claim 11, wherein the set voltage-frequency domains are specified.

13. The method of claim 9, the method further comprising:
    synthesizing the first core with the first architecture for the first voltage-frequency domain; and synthesizing the second core with the first architecture for the second voltage-frequency domain.

14. A computer program product for multicore processor design comprising:
- a non-transitory computer readable storage medium having computer readable program code embodied therein, and when executed by a processor, the computer readable program code configured to:
- select a set of voltage-frequency domains for a cell library;
- synthesize synthetic voltage-frequency domains in the set of voltage-frequency domains by reducing one or more of a frequency and a voltage of each voltage-frequency domain in the set of voltage-frequency domains;
- calculating a first voltage-frequency domain for a first core with a first architecture and a second voltage-frequency domain for a second core with the first architecture through simulated annealing minimization of an equation $\Sigma E(F_i(v))$
- wherein E is an energy consumption, F is a frequency in the set of voltage-frequency domains, v is a voltage in the set of voltage-frequency domains, and v and F(v) are initially set to a highest voltage-frequency domain of the standard cell library, and the simulated annealing minimization is a function of a multicore performance yield as a function of voltage Y(v) for the first core and the second core, wherein Y(v) is calculated as $$Y(v) = Pr \frac{1}{n} \sum_{i=1}^{n} \frac{IPC_i(v)}{IPC_{base}}$$

where Pr is performance of the first core and the second core, IPCbase is instructions per cycle (IPC) of an application running in a core of the first and second cores with a highest voltage-frequency domain, IPCi(v) is an IPC of the application running on an $i^{th}$ core.

15. The computer program product of claim 14, the program code further configured to:
- synthesize the first core with the first architecture for the first voltage-frequency domain; and
- synthesize the second core with the first architecture for the second voltage-frequency domain.

* * * * *